(12) United States Patent
Lee et al.

(10) Patent No.: US 10,360,772 B2
(45) Date of Patent: Jul. 23, 2019

(54) DOORBELL APPARATUS AND METHOD OF CONTROLLING POWER SUPPLY OF THE SAME

(71) Applicant: LG INNOTEK CO., LTD., Seoul (KR)

(72) Inventors: Jin Kuk Lee, Seoul (KR); Jong Hoon Kim, Seoul (KR); Kwang Jae Park, Seoul (KR); Seong Chul Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/959,472

(22) Filed: Apr. 23, 2018

(65) Prior Publication Data

US 2018/0308323 A1    Oct. 25, 2018

(30) Foreign Application Priority Data

Apr. 25, 2017 (KR) .......................... 10-2017-0052954

(51) Int. Cl.
| | |
|---|---|
| *H02J 9/06* | (2006.01) |
| *G08B 3/10* | (2006.01) |
| *H02J 7/04* | (2006.01) |
| *H02J 7/00* | (2006.01) |
| *H01M 10/44* | (2006.01) |
| *H02J 9/00* | (2006.01) |
| *H02J 7/02* | (2016.01) |

(52) U.S. Cl.
CPC .............. *G08B 3/10* (2013.01); *H01M 10/44* (2013.01); *H02J 7/007* (2013.01); *H02J 7/04* (2013.01); *H02J 9/06* (2013.01); *H02J 7/02* (2013.01); *H02J 9/00* (2013.01); *H02J 9/002* (2013.01)

(58) Field of Classification Search
CPC ........ H01M 10/44; H02J 7/007; H02J 7/0068; H02J 7/0095; H02J 7/0098; H02J 7/02; H02J 7/04; H02J 7/00; H02J 9/00; H02J 9/005; H02J 9/002; H02J 9/04; H02J 9/06
See application file for complete search history.

(56) References Cited

U.S. PATENT DOCUMENTS

2019/0044372 A1*   2/2019   Cochran ............... H02J 7/0068

* cited by examiner

*Primary Examiner* — Benyam Haile
(74) *Attorney, Agent, or Firm* — Ked & Associates, LLP (57) ABSTRACT

A doorbell apparatus and a method of controlling power supply to a doorbell apparatus are provided. The doorbell apparatus may include a power supplier, a battery device charged with power from the power supplier device, a doorbell controller driven using the power from the power supplier device or the power charged in the battery device, and a power supply controller configured to control supply of power to the doorbell controller according to whether the power is input from the power supplier device.

17 Claims, 5 Drawing Sheets

DOORBELL APPARATUS AND METHOD OF CONTROLLING POWER SUPPLY OF THE SAME

CROSS-REFERENCE TO RELATED APPLICATION

This application claims priority under 35 U.S.C. § 119 to Korean Patent Application No. 10-2017-0052954, filed on Apr. 25, 2017, whose entire disclosure is incorporated herein by reference.

BACKGROUND

1. Field

A doorbell apparatus and a method of controlling power supply of a doorbell apparatus are disclosed herein.

2. Background

Figure 1:
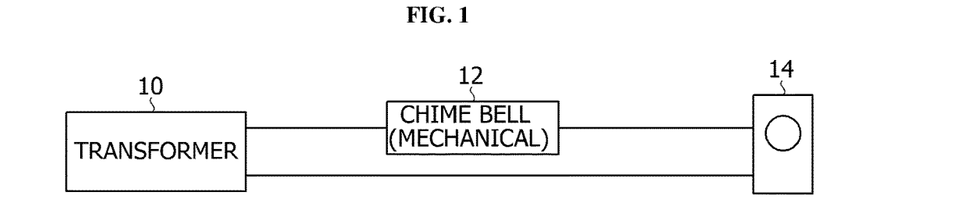
FIG. 1 to FIG. 3 illustrate examples of a doorbell system.
Figure 2:
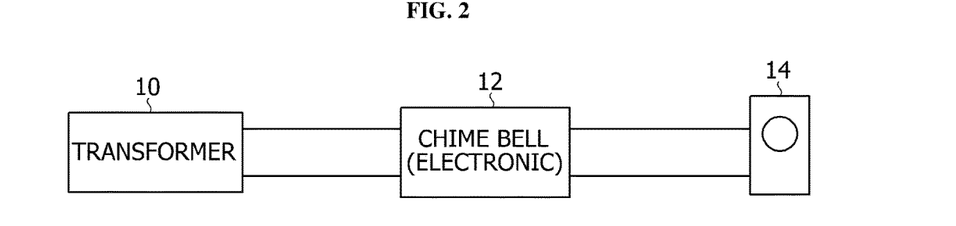
Figure 3:
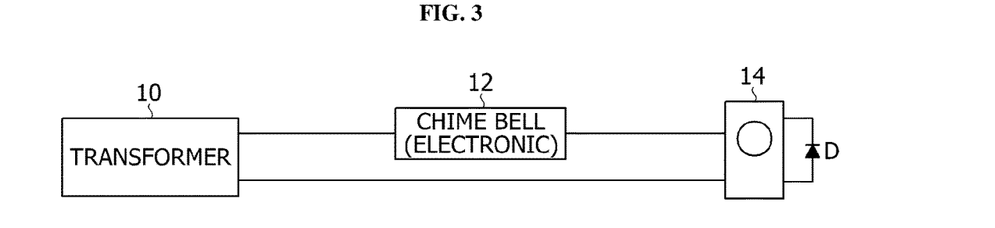

A doorbell system applied in a home may include a transformer, a doorbell, and a doorbell apparatus. FIGS. 1 to 3 illustrate examples of a doorbell system. Referring to FIGS. 1 to 3, a transformer 10 may include a primary coil and a secondary coil. The primary coil may be connected to an indoor alternating current (AC) power supply, and the secondary coil may be connected to a chime bell 12 and a doorbell apparatus 14. The transformer 10 may convert an AC voltage into a voltage having a level appropriate to drive the chime bell 12. For example, the transformer 10 may convert an AC voltage of 110 V into a voltage of 8 V to 24 V to drive the chime bell 12. The chime bell 12 may be a device configured to output a sound using electromagnetism or electricity and may be used interchangeably with, for example, a bell, a buzzer, a chime, or a doorbell. The chime bell 12 may be a mechanical chime bell configured to output a short sound using a firing pin or an electronic chime bell configured to output a melody.

As shown in FIG. 1, when the chime bell 12 is a mechanical chime bell, the transformer 10, the chime bell 12, and the doorbell apparatus 14 may be connected in series. When a doorbell button is pressed, a closed circuit may be formed with respect to the chime bell 12. A high current may flow in a wire coil in the chime bell 12, and thus, the wire coil may become an electromagnet. The firing pin may be provided inside the wire coil, and the wire coil becoming the electromagnet may pull the firing pin to output a sound.

As shown in FIG. 2, when the chime bell 12 is an electronic chime bell, the chime bell 12 may be connected in parallel to the transformer 10, and the doorbell apparatus 14 may be connected in parallel to the chime bell 12. The chime bell 12 may include a logic circuit including a main control unit (MCU). The MCU of the chime bell 12 may be operated using a current supplied separately from the transformer 10 and may continuously output a melody for a set time even when the doorbell button is pressed for a short time.

As shown in FIG. 3, even when the chime bell 12 is an electronic chime bell, the transformer 10, the chime bell 12, and the doorbell apparatus 14 may be connected in series. In this case, in order to extend a time for the chime bell 12 to output the melody, a diode D may be connected to the doorbell apparatus 14.

A doorbell apparatus may be an apparatus configured to announce the presence of a visitor and may include a doorbell interface. The doorbell interface may include, for example, an image module, a sensor module, an audio module, a communication module, and a light emitting diode (LED) module. As the doorbell interface included in the doorbell apparatus may include various functions and modules, power consumed by the doorbell apparatus may be increased.

Therefore, the doorbell apparatus may further include a battery. The doorbell apparatus may be driven using power supplied in a normal fashion. When an emergency such as a blackout occurs or when the power cannot be temporarily supplied to the doorbell apparatus due to a doorbell button being pressed, the doorbell apparatus may be driven using power stored in the battery.

When supply of power to the doorbell apparatus is cut off for a long time due to the emergency, such as, e.g., the blackout, the doorbell apparatus may be unstably operated or the battery power may be discharged. When the discharging of power in the battery is repeated, a lifespan of the battery may be reduced.

BRIEF DESCRIPTION OF THE DRAWINGS

The embodiments will be described in detail with reference to the following drawings in which like reference numerals refer to like elements wherein.

DETAILED DESCRIPTION

Figure 4:
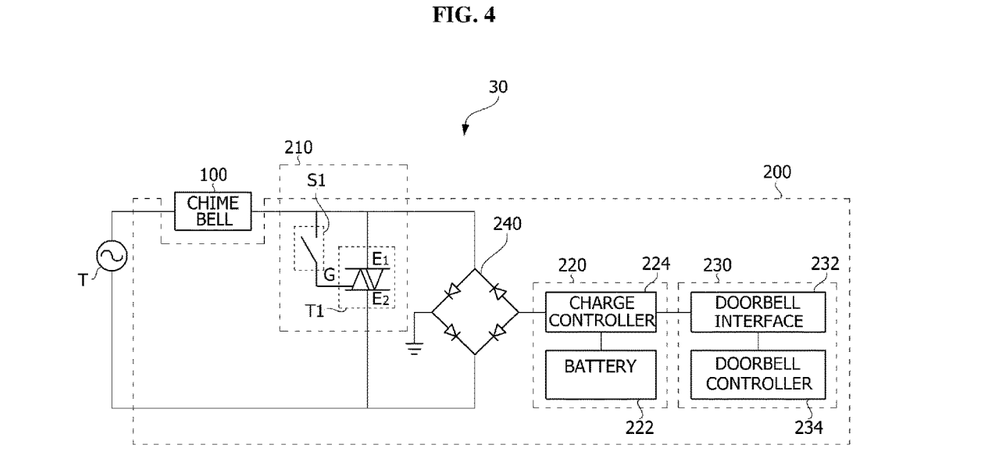
FIG. 4 is a schematic diagram illustrating a doorbell system according to an embodiment.
Figure 5:
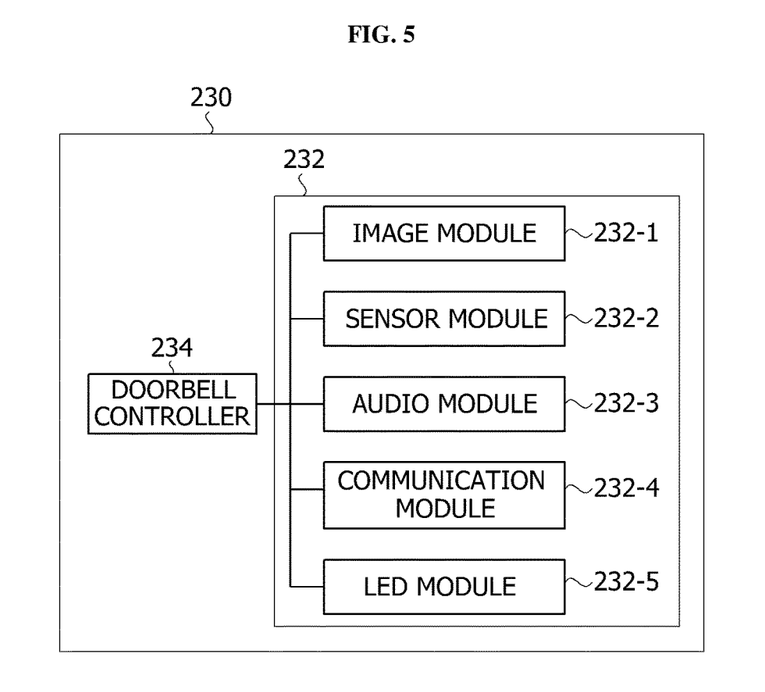
FIG. 5 is a block diagram illustrating a doorbell interface unit according to an embodiment.

FIG. 4 is a schematic diagram of a doorbell system 30 according to an embodiment, and FIG. 5 is a block diagram illustrating a doorbell interface unit or device 230 included in the doorbell system 30 according to an embodiment. Referring to FIG. 4, the doorbell system 30 may include a chime bell or chime 100 and a doorbell apparatus 200.

The chime bell 100 may be a device configured to output a sound using electromagnetism or electricity and may be used interchangeably with, for example, a bell, a buzzer, a chime, or a doorbell. The chime bell 100 may be a mechanical chime bell configured to output a short sound using a firing pin or an electronic chime bell configured to output a melody.

The doorbell apparatus 200 may include a power input unit or power supplier 210, a battery unit or device 220, and a doorbell interface unit or interface 230. The doorbell apparatus 200 may be used interchangeably with a video doorbell (VDB) and may be installed around a door. As shown in FIG. 5, the doorbell interface unit 230 may include a doorbell interface 232 and a doorbell controller 234.

The doorbell interface 232 may include, for example, at least one of an image module 232-1, a sensor module 232-2, an audio module 232-3, a communication module 232-4, and a light emitting diode (LED) module. However, the above-described modules are merely examples, and the doorbell interface 232 is not limited thereto and may include a number of modules of which the number may be greater or less than that of the above-described modules.

The doorbell controller 234 may be connected to the image module 232-1, the sensor module 232-2, the audio module 232-3, the communication module 232-4, and the LED module 232-5 and may control the doorbell interface unit 230. For example, the doorbell controller 234 may control enabling or disabling of modules included in the doorbell interface 232.

The image module 232-1 may include a camera unit or camera. The camera unit may include a lens and an image sensor. The lens may include at least one of a convex lens, a concave lens, a cylinder lens, a Fresnel lens, and a wide-angle lens and may capture an image of an object located within a certain range from an installation position thereof. The image sensor may convert an optical signal incident through the lens into an image signal. The image sensor may correspond to a component such as a digital camera and may function to convert light received through a camera lens, i.e., captured image information into an electrical signal, i.e., digital information.

The sensor module 232-2 may sense a surrounding object. The sensor module 232-3 may include, for example, at least one of a geomagnetic sensor, an acceleration sensor, an altimeter, a gyro sensor, an infrared sensor, and a proximity sensor. The infrared sensor may be a passive infrared ray (PIR) sensor. The PIR sensor may sense a change in temperature of an object. Accordingly, when a person moves, the sensor module 232-3 may sense the presence of the person using a change in temperature of the person. A plurality of sensor modules 232-3 may be installed around the image module 232-1.

The doorbell controller 234 may receive an image signal through the image module 232-1 and a sensing signal of an object through the sensor module 232-3 to process the received image signal and the received sensing signal. For example, the doorbell controller 234 may correct the image signal received through the image module 232-1 using the sensing signal of the object received through the sensor module 232-3.

The audio module 232-3 may include a microphone and a speaker. The microphone may receive an audio signal, and the speaker may output an audio signal. The doorbell controller 234 may process the audio signal input through the microphone. The communication module 232-4 may include a wired or wireless communication module and may transmit the image signal processed by the doorbell controller 234 to a display device or transmit the audio signal processed by the doorbell controller 234 to the speaker. The LED module 232-5 may be a light emitting module and may be used interchangeably with a flash LED. The doorbell interface unit 230 may be used interchangeably with a network camera or a camera device.

The doorbell system 30 may allow power input from a transformer T to be supplied only to the chime bell 100, or to the doorbell interface unit 230 through the chime bell 100 according to a turn-on state or a turn-off state of a doorbell button. A state in which the doorbell button is pressed may be expressed as an on-state or a turn-on state of the doorbell button, and a normal state, for example, a state in which the doorbell button is not pressed may be expressed as an off-state or a turn-off state of the doorbell button. When the doorbell button is pressed, a switch element or switch S1 of the power input unit 210 may be set to be closed, and when the doorbell button is not pressed, the switch element S1 of the power input unit 210 may be set to be opened. The transformer T may mean a transformer installed in a home as well as a power supply device which may be connected to the transformer installed in the home and may supply power to the doorbell system 30.

Alternating current (AC) power supplied from the transformer T may be supplied into the doorbell apparatus 200 through the power input unit 210. The power input unit 210 may further include a triode AC switch (TRIAC) element T1 connected to the switch element S1 in addition to the switch element S1. The TRIAC element T1 may be a semiconductor control component configured to control a bi-directional current and may have two main electrodes E1 and E2 and one gate electrode G. When there is no gate signal applied to the gate electrode G, the TRIAC element T1 may be turned off. When there is a gate signal applied to the gate electrode G, the TRIAC element T1 may be bidirectionally turned on regardless of a polarity of the two main electrodes E1 and E2.

When the doorbell button is pressed and the switch element S1 is closed, a gate signal may be applied to the gate electrode G of the TRIAC element T1, and thus, a closed circuit may be formed with respect to the chime bell 100. A path of a current may lead through the chime bell 100 in a direction in which the TRIAC element T1 is turned on, and a current may be blocked from flowing through a path leading to an inside of the doorbell apparatus 200. Since a current does not flow into the doorbell apparatus 200, power required by the doorbell interface unit 230 may be supplied from the battery unit 220.

When a pressed state of the doorbell button is released and the switch element S1 is opened, a path of a current may lead to the inside of the doorbell apparatus 200 through the chime bell 100. In this case, the doorbell apparatus 200 may further include a rectifier 240. The rectifier 240 may rectify AC supplied from the power input unit 210 into a direct current (DC). In this case, the rectifier 240 may include, for example, a bridge diode. The bridge diode may be a bridge circuit in which four diodes are connected. The bridge diode may rectify an AC into a DC and output the DC.

The battery unit 220 may receive a voltage output from the rectifier 240. The battery unit 220 may include a battery 222 and a charge controller 224. The charge controller 224 may control to power supply to the doorbell interface unit 230 or may charge the battery 222 with power. The charge controller 224 may control the battery 222 to supply power charged in the battery 222 to the doorbell interface unit 230. The charge controller 224 may be used interchangeably with a battery unit management IC (BMIC).

When an emergency such as a blackout occurs, even if the switch element S1 is opened, power may not be supplied to the doorbell apparatus 200. When supplying of power to the doorbell apparatus 200 is cut off for a long time, the doorbell apparatus 200 may be unstably operated or the battery 222 may be discharged. When the discharging of the battery 222 is repeated, a lifespan of the battery 222 may be reduced. A power supply controller may be added to the doorbell apparatus 200, thereby preventing the discharging of the battery 222.

Figure 6:
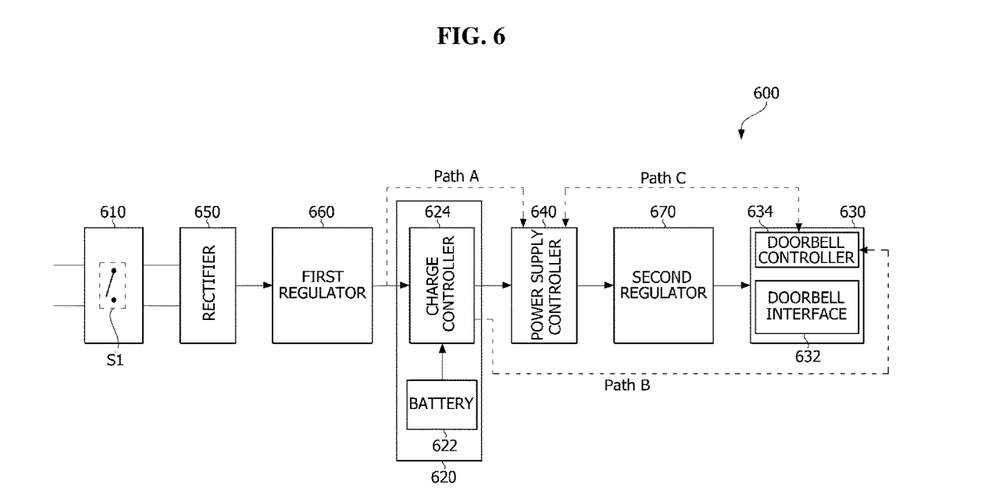
FIG. 6 is a block diagram illustrating a doorbell apparatus according to an embodiment.
Figure 7:
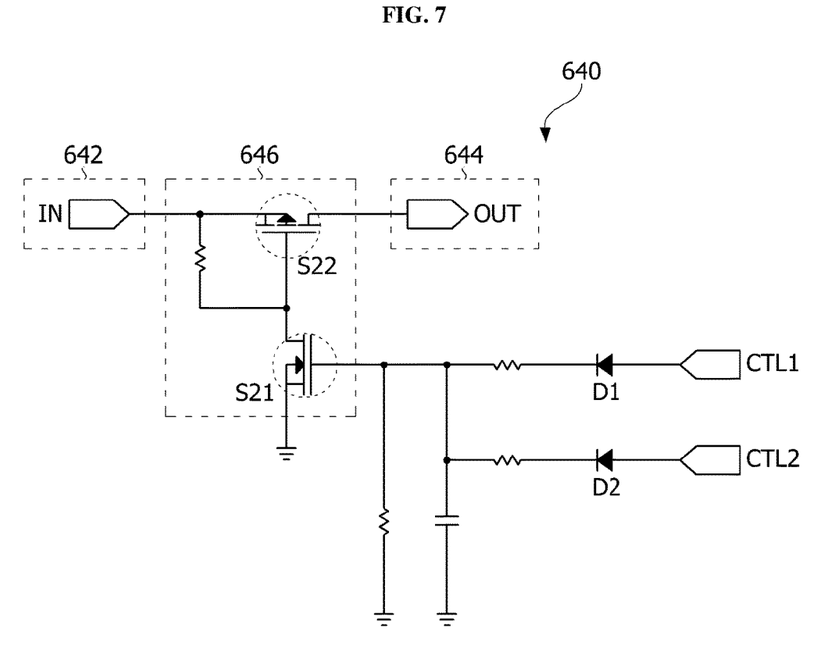
FIG. 7 illustrates an example of a power supply controller included in the doorbell apparatus.

FIG. 6 is a block diagram illustrating a doorbell apparatus 600 according to an embodiment, and FIG. 7 illustrates an example of a power supply controller 640 included in the doorbell apparatus 600 according to the embodiment. Descriptions of same or similar contents or components from FIGS. 4 and 5 have been omitted. Referring to FIG. 6, the doorbell apparatus 600 may include a power input unit or power supplier 610, a battery unit or device 620, a doorbell interface unit 630, and the power supply controller 640.

AC power supplied from a transformer T may be input into the doorbell apparatus 600 through the power input unit 610. Power input through the power input unit 610 may be referred to as normal power or normal electric power. The power input unit 610 may include a switch element S1. The switch element S1 may be set to be turned on when a doorbell button is pressed, and may be set to be turned off when the doorbell button is not pressed.

The battery unit 620 may be charged with power input from the power input unit 610. The battery unit 620 may include a battery 622 and a charge controller 624 configured to control charging of the battery 622. The doorbell interface unit 630 may be driven using power input from the power input unit 610 or power charged in the battery unit 620. For example, when normal power is input from the power input unit 610, the doorbell interface unit 630 may be driven using power input from the power input unit 610. When normal power cannot be input from the power input unit 610, the doorbell interface unit 630 may be driven using power charged in the battery unit 620.

In this case, the doorbell interface unit 630 may include a doorbell interface 632 and a doorbell controller 634 configured to control the doorbell interface 632. Since contents of the doorbell interface unit 630 are similar to those described with reference to FIG. 5, redundant descriptions thereof have been omitted.

The doorbell apparatus 600 may further include a first rectifier 650, a first regulator 660, and a second regulator 670. The rectifier 650 may be provided between the power input unit 610 and the first regulator 660. The first regulator 660 may be provided between the rectifier 650 and the battery unit 620. The second regulator 670 may be provided between the battery unit 620 and the doorbell interface unit 630.

The rectifier 650 may rectify an AC supplied from the power input unit 610 into a DC. The rectifier 650 may include, for example, a bridge diode. The bridge diode may be a bridge circuit in which four diodes are connected. The bridge diode may rectify an AC into a DC and output the DC.

The first regulator 660 may receive the DC rectified by the rectifier 650. The first regulator 660 may function to lower the DC output through the rectifier 650 to a voltage for the battery unit 620. The first regulator 660 may be a DC-to-DC converter. For example, the DC-to-DC converter may convert a voltage of 8V to 24V into a voltage of 5 V. Similarly, the second regulator 670 may function to lower a voltage input to the doorbell interface unit 630. The second regulator 670 may be a DC-to-DC converter.

The power supply controller 640 may be provided between the battery unit 620 and the doorbell interface unit 630 and may control power supply to the doorbell interface unit 630 according to whether power is normally input from the power input unit 610. As described above, in the case in which the power supply controller 640 is provided between the battery unit 620 and the doorbell interface unit 630, when normal power is not input, it may be possible to minimize consumption of a current charged in the battery unit 620.

When power is input from the power input unit 610, the power input from the power input unit 610 may be supplied to the doorbell interface unit 630 through the power supply controller 640. When power is not input from the power input unit 610, power charged in the battery unit 620 may be supplied to the doorbell interface unit 630 through the power supply controller 640. After the doorbell interface 632 included in the doorbell interface unit 630 is turned off, a path, through which power flows from the battery unit 620 to the doorbell interface unit 630, may be blocked.

When normal power is input from the power input unit 610, an output voltage of the first regulator 660 may be transferred to the power supply controller 640 through the battery unit 620, and a control signal output from the first regulator 660 may be transferred to the power supply controller 640 through path A. Accordingly, the power supply controller 640 may maintain a path through which power flows to the doorbell interface unit 630.

When power is not input from the power input unit 610, the charge controller 624 of the battery unit 620 may notify the doorbell controller 634 of the doorbell interface unit 630 through path B that power is not input from the power input unit 610. The doorbell controller 634 may turn off the doorbell interface 632 using power charged in the battery 622 and then may notify the power supply controller 640 through path C that the doorbell interface 632 is turned off. The power supply controller 640 may block the path through which power flows from the battery unit 620 to the doorbell interface unit 630.

In order to distinguish between a case in which power is not input into the doorbell apparatus 600 due to the switch element S1 of the power input unit 610 being closed in a state in which the doorbell button is pressed, and a case in which power is not input into the doorbell apparatus 600 due to occurrence of an emergency such as a blackout even in a state in which the switch element S1 is opened, the battery unit 620 or the doorbell interface unit 630 may further include a timer.

For example, in the case in which the battery unit 620 includes the timer, when a time for power to not be input from the power input unit 610 exceeds a certain time, the charge controller 624 of the battery unit 620 may determine that an emergency such as a blackout is occurring and may notify the doorbell controller 634 of the occurrence of the emergency through path B. Alternatively, in the case in which the doorbell interface unit 630 includes the timer, when a signal for notifying that power is not input from the power input unit 610 is received from the charge controller 624 through path B after a certain time has elapsed, the doorbell controller 634 may determine that an emergency such as a blackout is occurring and may turn off the doorbell interface 632. When an emergency such as a blackout occurs, the doorbell interface unit 630 may be primarily operated using power supplied from the battery unit 620 and the doorbell interface 632 in the doorbell interface unit 630 may be stably turned off, thereby preventing discharging of the battery unit 620.

Referring to FIG. 7, the power supply controller 640 may include an input terminal 642 connected to the battery unit 620, an output terminal 644 connected to the doorbell interface unit 630, and a switch element 646 provided between the input terminal 642 and the output terminal 644. Whether to block the path through which power is supplied to the doorbell interface unit 630 may depend on an on-state or an off-state of the switch element 646.

For example, when normal power is input from the power input unit 610, the switch element 646 of the power supply controller 640 may be turned on. A path from the input terminal 642 to the output terminal 644 of the power supply controller 640 may be opened, thereby supplying power to the doorbell interface unit 630. When an emergency such as a blackout occurs, the switch element 646 of the power supply controller 640 may be turned off. Accordingly, a power supply path from the input terminal 642 to the output terminal 644 of the power supply controller 640 may be blocked.

The power supply controller 640 may further include a first control terminal CTL1 configured to receive a control signal output between the power input unit 610 and the battery unit 620 and a second control terminal CTL2 configured to receive a control signal output from the doorbell controller 634 of the doorbell interface unit 630. The switch element 646 may include a first switch element or switch S21 and a second switch element or switch S22.

When normal power is input through the power input unit 610, a certain or predetermined control signal may be input through the first control terminal CTL1. The first switch element S21 and the second switch element S22 may be sequentially turned on, thereby supplying power to the doorbell interface unit 630. When normal power is not input through the power input unit 610, a control signal may not be input through the first control terminal CTL1, and thus, the first switch element S21 may be in a floating state and a certain control signal may be input through the second switch element S22. Accordingly, when the first switch element S21 and the second switch element S22 are sequentially turned off, the path, through which power is supplied to the doorbell interface unit 630, may be blocked.

The first switch element S21 may be an N-field-effect transistor (FET) element and the second switch element S22 may be a P-FET element, but the present disclosure is not limited thereto. Diodes D1 and D2 may be connected to the first control terminal CTL1 and the second control terminal CTL2, respectively. Accordingly, signals input to the first control terminal CTL1 and the second control terminal CTL2 may not interfere with each other.

Figure 8:
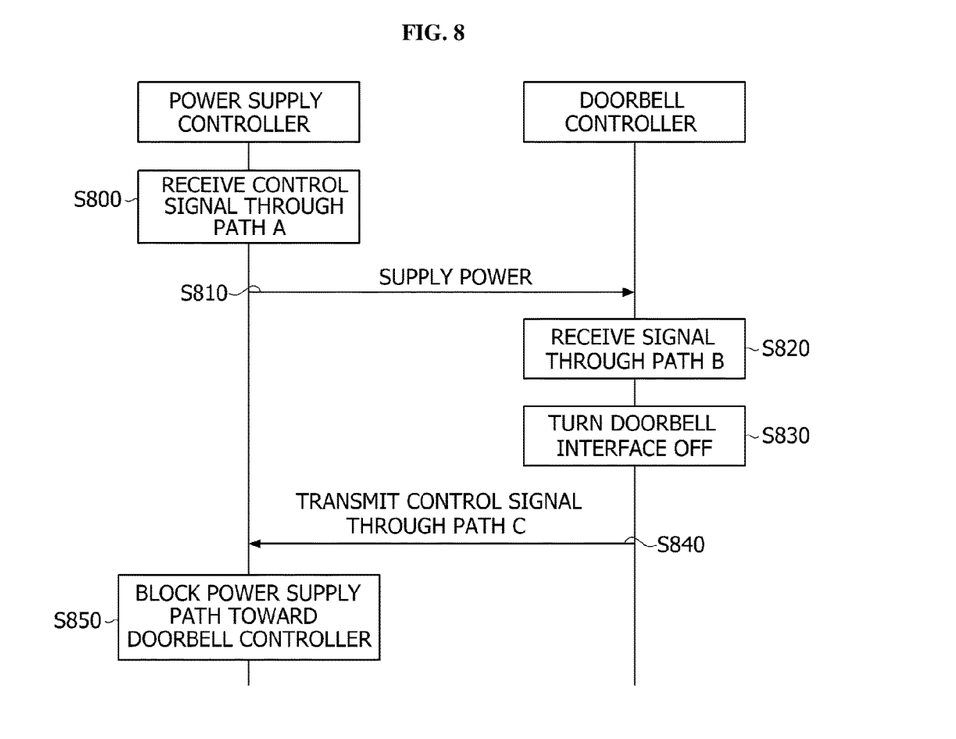
FIG. 8 is a flowchart of a method of controlling a doorbell apparatus according to an embodiment.

FIG. 8 is a flowchart of a method of controlling a doorbell apparatus according to an embodiment. Referring to FIG. 8, the power supply controller 640 may receive a control signal through path A shown in FIG. 6 (S800). The control signal passing through path A may be a signal indicating that normal power is input from the power input unit 610 and may be a signal output from the first regulator 660. Normal power supplied from the power input unit 610 may flow to the doorbell controller 634 through the power supply controller 640 (S810).

When an emergency such as a blackout occurs and thus normal power cannot be supplied from the power input unit 610, the doorbell controller 634 may receive a signal through path B shown in FIG. 6 (S820). The doorbell interface unit 630 may be driven using a signal primarily supplied from the battery 622, and concurrently, the doorbell controller 634 turns off the doorbell interface 632 (S830).

When the doorbell interface 632 is stably turned off, the doorbell controller 634 may transmit a control signal through path C shown in FIG. 6 (S840). The control signal passing through path C may be a signal indicating that the doorbell interface 632 of the doorbell interface unit 630 is turned off and may be output from the doorbell controller 634. Accordingly, the power supply controller 640 may block a power supply path toward the doorbell interface unit 630, and thus, power charged in the battery 622 may not be further consumed (S850).

Figure 9:
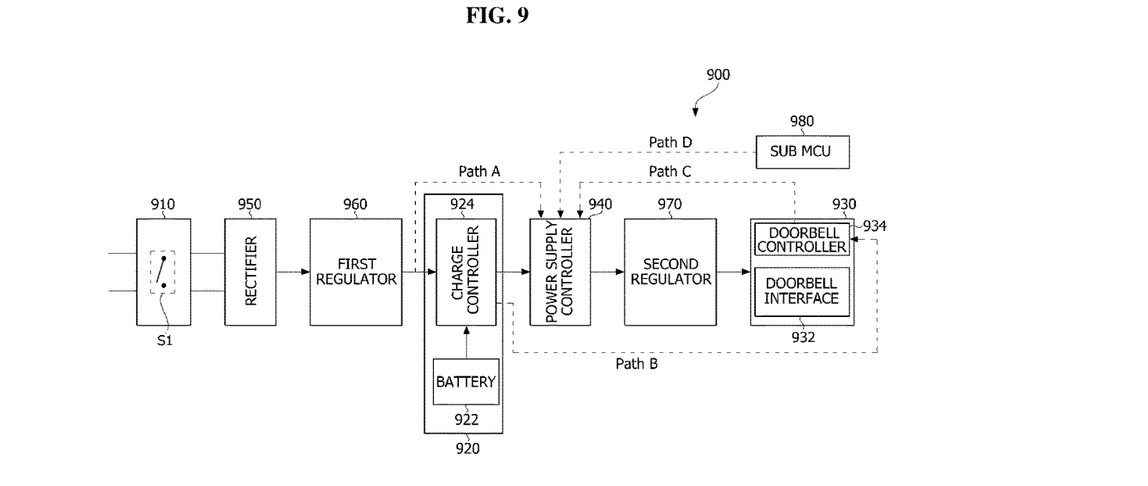
FIG. 9 is a block diagram illustrating a doorbell apparatus according to another embodiment.

FIG. 9 is a block diagram illustrating a doorbell apparatus 900 according to another embodiment. Referring to FIG. 9, the doorbell apparatus 900 may include a power input unit or power supplier 910, a battery unit or device 920, a doorbell interface unit 930, a power supply controller 940, a rectifier 950, a first regulator 960, and a second regulator 970. The doorbell apparatus 900 may be operated in a same or similar manner as the doorbell apparatus 600 of FIG. 6.

When power is input from the power input unit 910, the power input from the power input unit 910 may be supplied to the doorbell interface unit 930 through the power supply controller 940. When normal power is input from the power input unit 910, an output voltage of the first regulator 960 may be transferred to the power supply controller 940 through the battery unit 920, and a control signal output from the first regulator 960 may be transferred to the power supply controller 940 through path A. Accordingly, the power supply controller 940 may maintain a path through which power flows to the doorbell interface unit 930.

When power is not input from the power input unit 910, power charged in a battery 922 may be supplied to the doorbell interface unit 930 through the power supply controller 940. After a doorbell interface 932 included in the doorbell interface unit 930 is opened, a path, through which power flows from the battery unit 920 to the doorbell interface unit 930, may be blocked.

When power is not input from the power input unit 910, a charge controller 924 of the battery unit 920 may notify the doorbell controller 934 through path B that power is not input from the power input unit 910. Thus, the doorbell controller 934 may turn off the doorbell interface 932 using power charged in the battery 922 and then may notify the power supply controller 940 through path C that the doorbell interface 932 is turned off. The power supply controller 940 may block the path through which power flows from the battery unit 920 to the doorbell interface unit 930.

When a doorbell is pressed while a blackout continues, the doorbell interface unit 930 may be instantaneously turned on to perform a certain operation. To this end, the doorbell apparatus 900 according to another embodiment may further include a sub MCU 980. The sub MCU 980 may be an MCU operated at a low power. The sub MCU 980 may be in a sleep state and then may be turned on in an emergency by receiving power from the battery 922 only in an emergency, such as, for example, a blackout.

The sub MCU 980 may be connected to a switch element S1 of the power input unit 910. When the doorbell button is pressed when the switch element S1 is turned on, the sub MCU 980 may transmit a control signal to the power supply controller 940 through path D. Accordingly, a path, through which power flows from the power supply controller 940 to the doorbell interface unit 930, may be temporarily opened, and power stored in the battery 922 may be supplied to the doorbell interface unit 930 through the power supply controller 940. The doorbell controller 934 may turn on some components of the doorbell interface 932 and may allow some components to perform a certain or predetermined operation using power supplied from the battery 922. For example, an image module of the doorbell interface 932 may be turned on to acquire an image temporarily for several seconds and then may store the acquired image. The stored image may be provided to a user in a state in which normal power is supplied.

Figure 10:
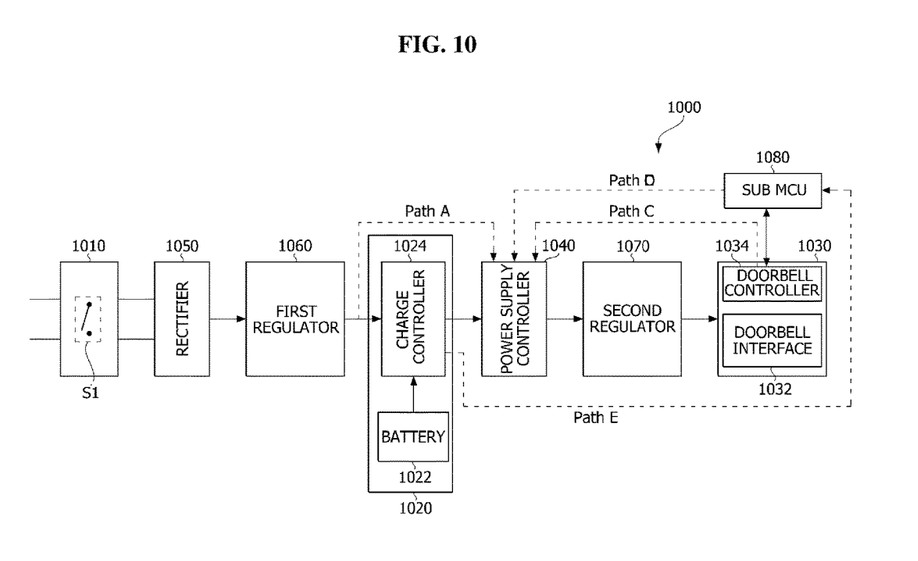
FIG. 10 is a block diagram illustrating a doorbell apparatus according to still another embodiment.

FIG. 10 is a block diagram illustrating a doorbell apparatus 1000 according to still another embodiment. Referring to FIG. 10, the doorbell apparatus 1000 may include a power input unit or power supplier 1010, a battery unit 1020, a doorbell interface unit 1030, a power supply controller 1040, a rectifier 1050, a first regulator 1060, and a second regulator 1070. The doorbell apparatus 1000 may be operated in a same or similar manner as the doorbell apparatus 600 of FIG. 6.

When power is input from the power input unit 1010, the power input from the power input unit 1010 may be supplied to the doorbell interface unit 1030 through the power supply controller 1040. When normal power is input from the power input unit 1010, an output voltage of the first regulator 1060 may be transferred to the power supply controller 1040 through the battery unit 1020, and a control signal output from the first regulator 1060 may be transferred to the power supply controller 1040 through path A. Accordingly, the power supply controller 1040 may maintain a path through which power flows to the doorbell interface unit 1030.

When power is not input from the power input unit 1010, power charged in a battery unit or device 1022 may be supplied to the doorbell interface unit 1030 through the power supply controller 1040. After a doorbell interface unit 1032 included in the doorbell interface unit 1030 is opened, a path, through which power flows from the battery unit 1022 to the doorbell interface unit 1030, may be blocked.

The doorbell apparatus 1000 may further include a sub MCU 1080. The sub MCU 1080 may be an MCU operated at a low power. The sub MCU 1080 may be turned on by receiving power from the battery unit 1022 even in an emergency, such as, e.g., a blackout. The sub MCU 1080 may be connected to a switch element S1 of the power input unit 1010.

When power is not input from the power input unit 1010, a charge controller 1024 of the battery unit 1020 may notify the sub MCU 1080 through path E that power is not input from the power input unit 1010. Since the sub MCU 1080 is connected to the switch element S1, it may be possible to distinguish between a state in which power is not input due to the switch element S1 being turned on, and a state in which power is not input due to an emergency. The sub MCU 1080 may notify the doorbell controller 1034 that power is not input from the power input unit 1010, and the doorbell controller 1034 may turn off the doorbell interface unit 1032 using power charged in the battery 1022. Then, it may be possible to block a path through which power flows to the doorbell interface unit 1030 through the power supply controller 1040. A control signal for notifying that the doorbell interface unit is turned off is illustrated as being transferred to the power supply controller 1040 through path C, but the present disclosure is not limited thereto. The sub MCU 1080 may transfer the control signal to the power supply controller 1040.

When the doorbell is pressed while a blackout continues, the doorbell interface unit 1030 may be instantaneously turned on to perform a certain or predetermined operation. When the doorbell button is pressed when the switch element S1 is turned on, the sub MCU 1080 may transmit a control signal to the power supply controller 1040 through path D. A path, through which power flows from the power supply controller 1040 to the doorbell interface unit 1030, may be temporarily opened, and power stored in the battery unit 1022 may be supplied to the doorbell interface unit 1030 through the power supply controller 1040. Therefore, the doorbell controller 1034 may turn on some components of the doorbell interface unit 1032 and may allow some components to perform a certain or predetermined operation. For example, an image module of the doorbell interface unit 1032 may be turned on to acquire an image temporarily for several seconds and then may store the acquired image. The stored image may be provided to a user or an image or a video may be transmitted to the user in a state in which normal power is supplied, for example a state connected to a network.

According to embodiments disclosed herein, a doorbell system may stably supply power to a doorbell apparatus and may stably operate the doorbell apparatus. Even when an emergency, such as, for example, a blackout, occurs, the doorbell system may prevent discharging of a battery, thereby preventing a reduction in a lifespan of the battery.

According to embodiments disclosed herein, a doorbell apparatus may include a power input unit or power supplier, a battery unit or device charged with power input from the power input unit, a doorbell controller driven using the power input from the power input unit or the power charged in the battery unit, and a power supply controller configured to control supplying of power to the doorbell controller according to whether the power is input from the power input unit. The battery unit may include a battery and a charge controller configured to control charging of the battery. The power input from the power input unit may be supplied to the doorbell controller through the power supply controller when the power is input from the power input unit. Power of the battery may be supplied to the doorbell controller through the power supply controller when the power is not input from the power input unit. When a preset or predetermined time has elapsed, the doorbell controller may cut off power supply from the power supply controller. When the power is not input from the power input unit, the charge controller may notify the doorbell controller that the power is not input from the power input unit, and when the preset time has elapsed, the doorbell controller may block a path through which power flows from the battery unit to the doorbell controller through the power supply controller.

The doorbell apparatus may further include a regulator configured to convert the power input from the power input unit. When the power is input from the power input unit, the regulator may transfer a control signal to the power supply controller such that the power supply controller maintains the path through which the power flows to the doorbell controller.

The power supply controller may include an input terminal connected to the battery, an output terminal connected to the doorbell controller, and a switch element provided between the input terminal and the output terminal. Whether to block the path through which the power is supplied to the doorbell controller may depend on an on-state or an off-state of the switch. The power supply controller may further include a first control terminal configured to receive a control signal output from the regulator and a second control terminal configured to receive a control signal output from a control unit of the doorbell controller.

The switch element may include a first switch element and a second switch element. When a certain signal is input from the first control terminal, the first switch element and the second switch element may be sequentially turned on and power may be supplied to the doorbell controller. When the certain signal is not input from the first control signal and is input from the second control terminal, the first switch element and the second switch element may be sequentially turned off, and the path through which the power is supplied to the doorbell controller may be blocked.

The first switch element may be one element of an N-field-effect transistor (FET) element and a P-FET element, and the second switch element may be the other element of the N-FET element and the P-FET element. A diode may be connected to each of the first control terminal and the second control terminal.

The doorbell apparatus may further include a doorbell interface controlled by the doorbell controller. When the power is not input from the power input unit, the doorbell controller may perform a control to turn the doorbell interface unit off within the preset or predetermined time. The doorbell controller may notify the power supply controller that the doorbell interface unit is turned off, and the power supply controller may block a path through which power flows from the battery unit to the doorbell controller. The battery unit or the doorbell controller may include a timer.

The doorbell apparatus may further include a sub controller turned on by receiving power from the battery unit only in a state in which power supply is cut off from the power supply controller to the doorbell controller. When a doorbell button is pressed in a state in which the sub controller is turned on, the sub controller may transmit a control signal to the power supply controller. When the power supply controller receives the control signal from the sub controller, the power supply controller may temporarily open a path through which power flows toward the doorbell controller.

The doorbell apparatus may further include a sub controller configured to receive power from the battery unit and sense an on-state or an off-state of a switch element included in a doorbell button. When the sub controller receives a signal from the charge controller and senses that the switch element of the doorbell button is in the off-state, the sub controller may notify the doorbell controller that the switch element included in the doorbell button is in the off-state, the received signal being a signal for notifying that the power may not be input from the power input unit.

According to embodiments disclosed herein, a control method of supplying power to a doorbell apparatus may include charging a battery using power input from a power input unit, supplying the power input from the power input unit to a power supply controller, and cutting off power supply from the power supply controller when the power is not input from the power input unit and a preset or predetermined time has elapsed. The cutting off of the power supply may include supplying power from the battery to the doorbell controller through the power supply unit, transmitting a control signal to the doorbell controller, the control signal being a signal for notifying that the power is not input from the power input unit, and blocking a path through which the power flows from the battery unit to the doorbell controller through the power supply controller when the preset or predetermined time has elapsed.

The supplying of the power may include receiving, by the power supply controller, a control signal indicating that normal power is input from the power input unit, opening a path from an input terminal to an output terminal of the power supply controller, and supplying the normal power to the doorbell controller. The blocking of the path, through which the power flows from the battery unit to the doorbell controller through the power supply controller when the preset or predetermined time has elapsed, may include turning off, by the doorbell controller, a doorbell interface, transmitting, by the doorbell controller, a signal to the power supply controller, the signal being a signal for notifying that the doorbell interface is turned off, and blocking, by the power supply controller, the path through which the power flows from the battery unit to the doorbell controller.

As described above, exemplary embodiments of the present disclosure have been described with reference to the accompanying drawings. However, the present disclosure is not limited to the above-described exemplary embodiments. It may be apparent to one who has an ordinary skill in the art that there may be many modifications and variations within the same technical spirit of the present disclosure.

While the present disclosure is open to various modifications and alternative embodiments, specific embodiments thereof will be described and shown by way of example in the drawings. However, it should be understood that there is no intention to limit the present disclosure to the particular embodiments disclosed, and, to the contrary, the present disclosure is to cover all modifications, equivalents, and alternatives falling within the spirit and scope of the present disclosure.

It should be understood that, although terms including ordinal numbers such as "first," "second," and the like may be used herein to describe various elements, the elements are not limited to the terms. The terms are only used to distinguish one element from another. For example, a second element could be termed a first element without departing from the scope of the claims of the present disclosure, and similarly a first element could be also termed a second element. The term "and/or" includes any and all combinations of a plurality of associated listed items.

In a case that one component is described as "connected to" or "accessing" another component, it may be connected to or access the corresponding component directly. Yet, a new component or components may exist in between. On the other hand, in a case that one component is described as "directly connected to" or "directly accessing" another component, it should be understood that the new component or components may not exist in between.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A doorbell apparatus comprising:
   a power supplier;
   a battery device charged with power from the power supplier;
   a doorbell controller driven using the power from the power supplier or the power charged in the battery device;
   a power supply controller configured to control supply of power to the doorbell controller according to whether the power is input from the power supplier;
   a doorbell button; and
   a sub controller configured to receive power from the battery device and sense an on-state or an off-state of a switch element included in the doorbell button,
   wherein the battery device includes a battery and a charge controller configured to control charging of the battery,
   when the power is input from the power supplier, the power from the power supplier is supplied to the doorbell controller through the power supply controller,
   when the power is not input from the power supplier, power from the battery is supplied to the doorbell controller through the power supply controller, and
   when a predetermined time has elapsed, the doorbell controller cuts off power supply from the power supply controller; and
   wherein, when the sub controller receives a signal from the charge controller and senses that the switch element included in the doorbell button is in the off-state, the sub controller notifies the doorbell controller that the switch element included in the doorbell button is in the off-state, the signal being a notification that the power is not input from the power supplier.

2. The doorbell apparatus of claim 1, wherein:
   when the power is not input from the power supplier, the charge controller notifies the doorbell controller that the power is not input from the power supplier; and
   when the predetermined time has elapsed, the doorbell controller blocks a path through which power flows from the battery device to the doorbell controller through the power supply controller.

3. The doorbell apparatus of claim 2, further comprising a regulator configured to convert the power input from the power supplier,
   wherein, when the power is input from the power supplier, the regulator transfers a control signal to the power supply controller such that the power supply controller maintains the path through which the power flows to the doorbell controller.

4. The doorbell apparatus of claim 3, wherein the power supply controller includes an input terminal connected to the battery, an output terminal connected to the doorbell controller, and a switch element provided between the input terminal and the output terminal, and
   whether to block the path through which the power is supplied to the doorbell controller depends on an on-state or an off-state of the switch.

5. The doorbell apparatus of claim 4, wherein the power supply controller further includes a first control terminal configured to receive a control signal output from the regulator and a second control terminal configured to receive a control signal output from a control device of the doorbell controller.

6. The doorbell apparatus of claim 5, wherein the switch element includes a first switch element and a second switch element, and
   when a predetermined signal is input from the first control terminal, the first switch element and the second switch element are sequentially turned on and power is supplied to the doorbell controller.

7. The doorbell apparatus of claim 6, wherein, when the predetermined signal is not input from the first control signal and is input from the second control terminal, the first switch element and the second switch element are sequentially turned off, and the path through which the power is supplied to the doorbell controller is blocked.

8. The doorbell apparatus of claim 7, wherein the first switch element is one of an N-field-effect transistor (FET) element and a P-FET element, and the second switch element is another of the N-FET element and the P-FET element.

9. The doorbell apparatus of claim 7, wherein a diode is connected to each of the first control terminal and the second control terminal.

10. The doorbell apparatus of claim 1, further comprising a doorbell interface controlled by the doorbell controller,
wherein, when the power is not input from the power supplier, the doorbell controller performs a control to turn the doorbell interface off within the predetermined time.

11. The doorbell apparatus of claim 10, wherein:
the doorbell controller notifies the power supply controller that the doorbell interface is turned off; and
the power supply controller blocks a path through which power flows from the battery device to the doorbell controller.

12. The doorbell apparatus of claim 11, wherein the battery device or the doorbell controller includes a timer.

13. The doorbell apparatus of claim 1, further comprising:
a doorbell button; and
a sub controller turned on by receiving power from the battery device only in a state in which power supply is cut off from the power supply controller to the doorbell controller,
wherein, when the doorbell button is pressed in a state in which the sub controller is turned on, the sub controller transmits a control signal to the power supply controller.

14. The doorbell apparatus of claim 13, wherein, when the power supply controller receives the control signal from the sub controller, the power supply controller temporarily opens a path through which power flows to the doorbell controller.

15. A control method of supplying power to a doorbell apparatus, the control method comprising:
charging a battery using power from a power supplier;
supplying the power from the power supplier to a power supply controller; and
cutting off power supply from the power supply controller when the power is not input from the power supplier and a predetermined time has elapsed,
wherein the cutting off of the power supply includes supplying power from the battery to the doorbell controller through the power supply controller,
transmitting a control signal to the doorbell controller, the control signal notifying that the power is not input from the power supplier, and
blocking a path through which the power flows from the battery device to the doorbell controller through the power supply controller when the predetermined time has elapsed;
receiving power, at a sub controller, from the battery device and sense an on-state or an off-state of a switch element included in a doorbell button,
controlling charging of the battery using a charge controller,
wherein, when the sub controller receives a signal from the charge controller and senses that the switch element included in the doorbell button is in the off-state, the sub controller notifies the doorbell controller that the switch element included in the doorbell button is in the off-state, the signal being a notification that the power is not input from the power supplier.

16. The control method of claim 15, wherein the supplying of the power includes:
receiving, by the power supply controller, a control signal indicating that power is input from the power supplier;
opening a path from an input terminal to an output terminal of the power supply controller; and
supplying the power to the doorbell controller.

17. The control method of claim 15, wherein the blocking of the path, through which the power flows from the battery device to the doorbell controller through the power supply controller when the predetermined time has elapsed, includes:
turning off, by the doorbell controller, a doorbell interface;
transmitting, by the doorbell controller, a signal to the power supply controller, the signal notifying that the doorbell interface is turned off; and
blocking, by the power supply controller, the path through which the power flows from the batter device to the doorbell controller.

* * * * *